March 14, 1967 R. J. HOLTON 3,308,708

FASTENING DEVICE

Filed Aug. 14, 1964 3 Sheets-Sheet 1

INVENTOR.
ROBERT J. HOLTON
BY
Teare, Fetzer & Teare
ATTORNEYS

March 14, 1967 R. J. HOLTON 3,308,708

FASTENING DEVICE

Filed Aug. 14, 1964 3 Sheets-Sheet 2

INVENTOR.
ROBERT J. HOLTON

BY Teare, Fetzer & Teare

ATTORNEYS

INVENTOR.
ROBERT J. HOLTON
BY
Pearne, Gordon & Pearne
ATTORNEYS

United States Patent Office 3,308,708
Patented Mar. 14, 1967

1

3,308,708
FASTENING DEVICE
Robert J. Holton, Cleveland, Ohio, assignor to Tinnerman Products, Inc., Cleveland, Ohio, a corporation of Ohio
Filed Aug. 14, 1964, Ser. No. 389,752
5 Claims. (Cl. 85—32)

This invention relates to fastening devices and more particularly to sheet metal fastening devices adapted for installation with threaded members, such as studs, bolts, screws or the like, and that can be applied for holding a plurality of parts in assembled relationship.

Fastening devices of this type have been proposed with screw-receiving means and locking elements cooperating therewith for engagement with a screw thread. However, such heretofore known fastening devices have not been satisfactory in sustaining the high expansive and torque forces imposed by the threads and have required that the fastening device be made too large for many applications, particularly in blind or inaccessible locations. Furthermore, these devices have not provided a smooth, uniform engagement during travel along the threads and has resulted in marring or stripping of the threads and consequent misalignment or cocking of the fastener relative to the screw.

Accordingly, an object of the present invention is to provide a sheet metal fastening device which is economical to produce and which is particularly satisfactory for assembly with a threaded member, such as a stud, bolt, screw or the like for holding a plurality of parts together.

Another object of the present invention is to provide a fastening device of the character described which incorporates improved strength characteristics for sustaining the high expansive and torque forces imposed by the threads upon installation with a threaded member.

A further object of the present invention is to provide a fastening device of the character described which is capable of smooth and uniform turning application upon a threaded member without marring or stripping of the threads.

A further object of the present invention is to provide a fastening device of the character described which is adapted for threaded engagement with a threaded member such as a stud, screw, bolt or the like, for mounting or securing an object or article to a supporting wall or panel which is not conveniently or readily accessible at the rearward side to complete the assembly.

Other objects and advantages of the invention will be apparent from the following description taken in conjunction with the accompanying drawings wherein.

Figure 11:
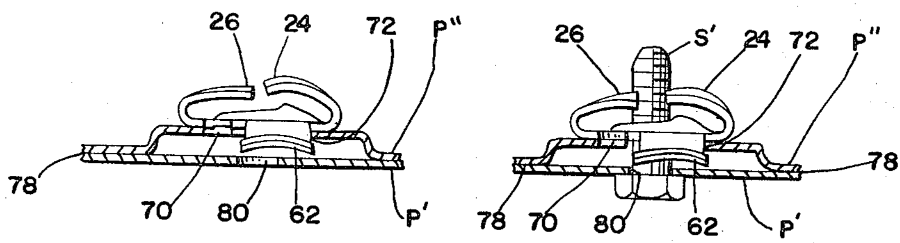
Figure 12:
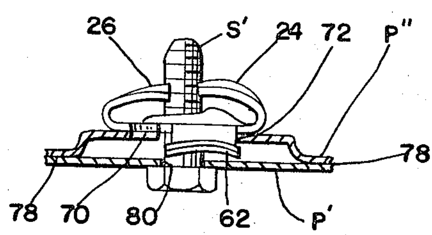

FIG. 11 is an enlarged cross-sectional view showing the initial installed position of the modified form of the fastening device for attachment in an opening and through the forward side of a supporting panel; and FIG. 12 is an enlarged cross-sectional view similar to that of FIG. 11, but showing the modified form of the fastening device fully assembled with a threaded member for holding a plurality of parts together.

2

Figure 1:
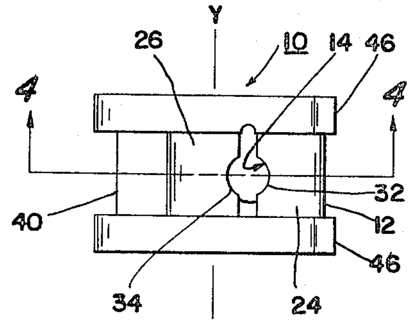
FIG. 1 is an enlarged top plan view of the fastening device made in accordance with the present invention.
Figure 2:
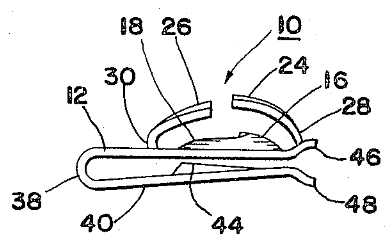
FIG. 2 is a side edge elevation of the fastening device shown in FIG. 1.
Figure 3:
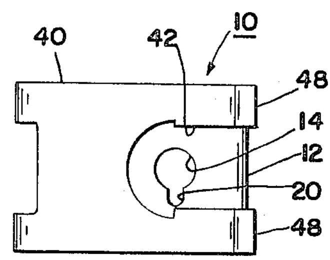
FIG. 3 is an enlarged elevation view showing the bottom side of the fastener of FIG. 1.
Figure 4:
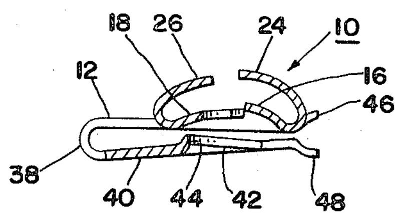
FIG. 4 is a longitudinal cross-sectional view taken along the plane indicated by the line 4—4 of FIG. 1.
Figure 5:
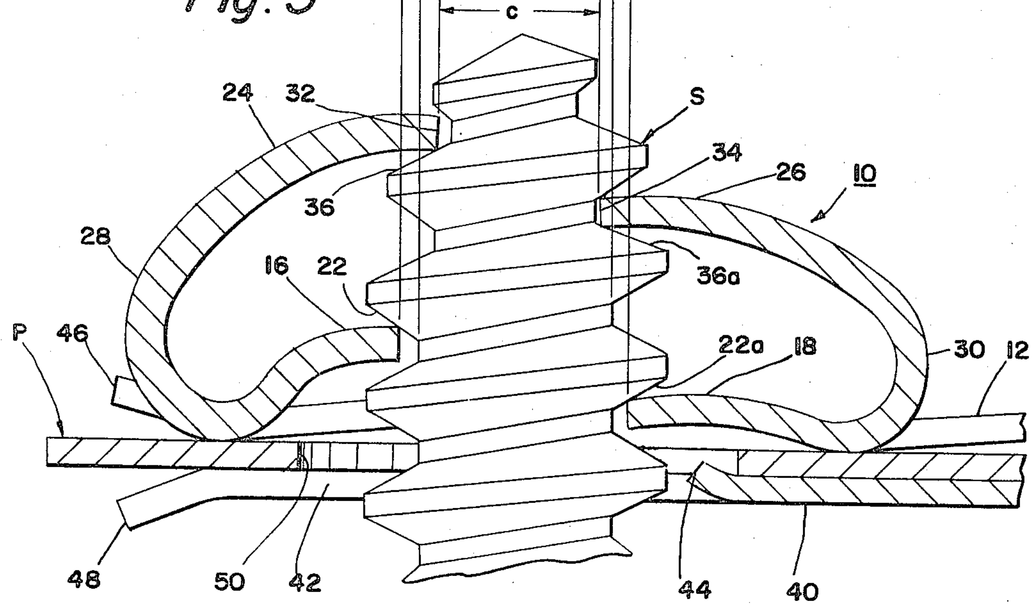
FIG. 5 is an enlarged sectional view with parts broken away showing the fastening device of the present invention assembled on a supporting panel or the like, and illustrating the inter-relationship of the warped edges and the resilient fingers upon initial installation of a threaded member, such as a screw, with the fastener.
Figure 6:
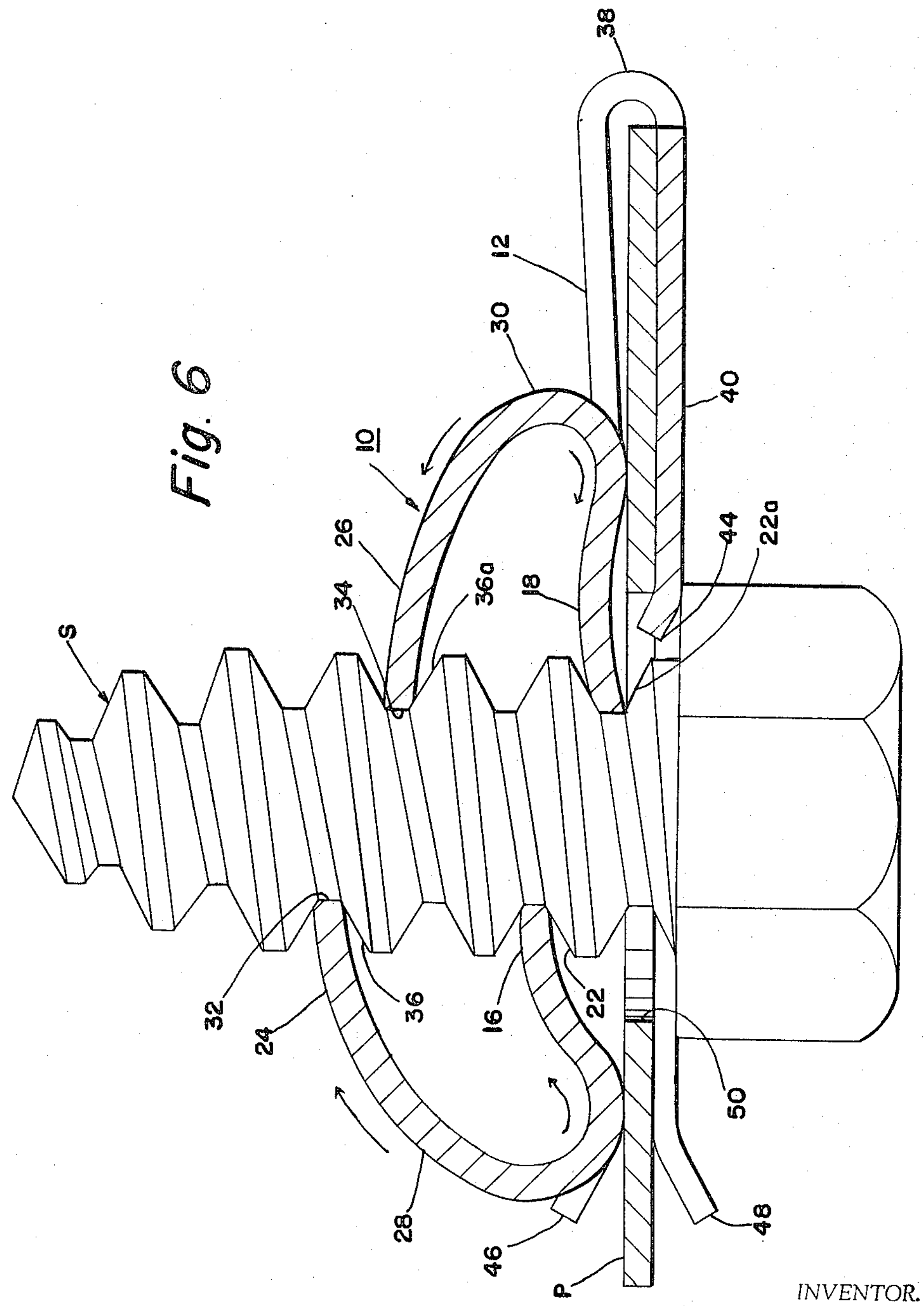
FIG. 6 is an enlarged vertical sectional view similar to that of FIG. 5, but showing the inter-relationship of the warped edges and the resilient fingers after final installation of the threaded member with the fastening device.
Figure 7:
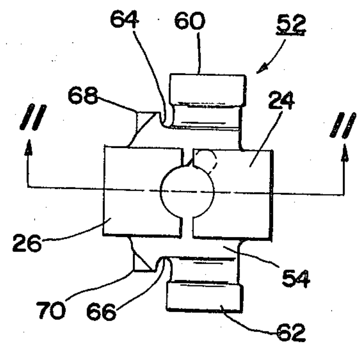
FIG. 7 is a top plan view showing a modified form of fastening device which is particularly useful for mounting or securing an object to a supporting wall or panel, which is not conveniently or readily accessible at the rearward side to complete the assembly.
Figure 8:
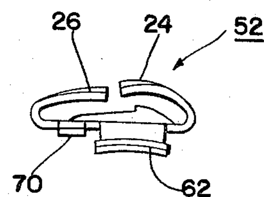
FIG. 8 is a front edge elevational view of the fastening device of FIG. 7.

Referring to FIGS. 1 to 4 of the drawings, there is illustrated an embodiment of the invention wherein the one piece fastening device is designated generally at 10. The fastening device 10 is of a relatively simple, inexpensive article of manufacture adapted for economical quantity production from standard sheet metal strip with minimal waste of material. The fastening device 10 may be made from any suitable sheet metal preferably that of a spring-like nature, such as spring steel or cold rolled steel having spring-like characteristics. The blank for the fastening device is so provided as to define a substantially flat sheet metal base 12. The base 12 is provided, in off-set relationship relative to its transverse axis Y—Y, with a bolt or screw-receiving aperture 14. In the embodiment shown, the aperture 14 is deformed so as to provide a generally frusto-conical, in elevation, configuration defined by upper 16 and lower 18 warped edges separated from one another by a generally radially extending slot 20. The upper and lower edges 16 and 18 coact to form a helix that is adapted to engage the corresponding helical turn of a thread on a stud or screw S (FIGS. 5 and 6). It can be seen in FIG. 5, that the diameter *a* of the helix defined by the warped edges 16 and 18 is substantially greater than the root diameter *b* of the screw S so that the warped edges engageably coact with the lower surface of successive of the threads 22 and 22*a* in the initial installing position of the fastener, as will hereinafter be more fully described.

As shown, the base 12 is struck out on opposite sides of the thread engaging aperture 14 to provide a pair of resilient fingers 24 and 26. The finger 24 curves angularly upwardly and inwardly from the plane of the base 12 and forms a curved fulcrum portion 28 spaced from the general plane of the base. The finger 26 is of substantially identical construction as the finger 24 including a similar fulcrum portion 30, except that its free end portion extends slightly below or in off-pitch, in side elevation, relationship relative to the free end portion of the aforementioned finger 24. The free end portions of the fingers 24 and 26, respectively, are preferably cut out concavely, as at 32 and 34 (FIG. 1), to facilitate threaded engagement wtih the screw S. It will be noted that the radial distance *c* between the cut out portions 32 and 34 of the fingers 24 and 26 in their normal and unengaged position is substantially smaller than that of the root diameter *b* of the screw S, and hence, is also substantially smaller than the diameter *a* of the helix defined by the warped edges 16 and 18. By such arrangement, the thread engaging portions 32 and 34 of the fingers 24 and 26 engageably coact with the upper surfaces 36 and 36*a* of successive of the threads in the initial installing position of the fastener (FIG. 5).

For securement to a supporting wall or panel P, the base 12 has the end opposite the finger 24 bent downwardly and thence inwardly, as at 38, to provide a resilient spring arm 40. The arm 40 converges angularly inwardly toward the base 12 to provide a resilient clip-like arrangement which is spaced from and which coacts with the base 12 so as to receive and grip therebetween a marginal edge portion of the panel P to hold the fastener in bolt or screw-receiving position. The arm 40 is preferably provided with a generally U-shaped screw-receiving slot 42 which opens onto the free end of the arm and which is adapted to receive the screw S therethrough. The material adjacent the slot may be deformed to provide another, but single warped edge 44 disposed diametrically below the warped edge 18 of the thread-engaging aperture 14 to engage a marginal portion of opening 50 in the panel P to retain the fastener in attached position thereon. The free end portions of the base 12 and arm 40, respectively, may be bent outwardly from one another, as at 46 and 48, to provide a flared or divergent construction to facilitate insertion of the clip over the confronting marginal edge portion of the panel P.

In application of this form of the fastening device, the screw S is inserted through the U-shaped slot 42 in the arm 40 and upwardly through the opening 50 in the panel P. It will be manifest that by rotating the screw S upwardly in a clockwise direction (FIG. 5) the threads of the screw will first engage the warped edges 16 and 18 of the thread receiving aperture 14. Therefore, due to the fact that the diameter $a$ of the helix defined by the warped edges 16 and 18 is substantially greater than the root diameter $b$ of the screw S, as the screw moves upwardly, the warped edges cam against the under surface 22 and 22$a$ of the first of the engaged threads. By such arrangement, the thread exerts an axial downward force on the warped edges 16 and 18 which tends to progressively flatten the same into the general plane of the base 12. As the screw S continues to move upwardly, it engages the resilient fingers 24 and 26 and moves them upwardly until they snap over the crest of the first convolution of the thread to then cam against the upper surface 36 and 36$a$ of the next successive threads. Simultaneously with such movement, the progressive flattening action imparted to the warped edges 16 and 18 serves to pivot the fingers in a counterclockwise direction, as shown by the arrows, 24 and 26 about the fulcrum portions 28 and 30 which forces the thread engaging portions 32 and 34 of the fingers 24 and 26 into radial gripping engagement with the associated thread. Moreover, as the screw advances and due to the fact that the distance $c$ between thread engaging portions 32 and 34 of the fingers 24 and 26 is substantially smaller than the root diameter $b$ of the screw, there is achieved a counter-force which acts to pivot the fingers 24 and 26 in the opposite or clockwise, as shown by the arrows, direction about the fulcrum portions 28 and 30. Such counter-force causes the warped edges 16 and 18 to flatten still further to impart an even greater radial gripping action which actually jams the warped edges into tight locking engagement against the associated threads. Thus, in the final installed position of the fastener, the fingers 24 and 26 and the warped edges 16 and 18 are substantially deformed in a generally radial inward direction from their previous camming engagement upon only the upper 22, 22$a$ and lower 36, 36$a$ surfaces, respectively, of the threads into tight gripping engagement with substantially the entire exposed surface of the associated threads for permanently locking the fastener in assembled position with the panel P.

Moreover, from extensive testing and shadow-graphic investigation, it has been found that by the off-pitch relationship between both thread engagers, namely, the warped edges 16 and 18 and the resilient fingers 24 and 26 and the correlative dimensional relationship between the thread engaging portions 32 and 34 of the fingers and the root diameter of the screw, there is achieved a dual pivotal coaction of the fingers about the fulcrum portions 28 and 30 which enables the fingers, as well as the warped edges, to exert remarkable gripping power on the threads which greatly increases the torque strength of the fastener. It has further been found that such arrangement acts to uniformly distribute the expansive force of the threads to effectively prevent the localization of stress at any one particular point on the fastener thereby greatly increasing the usability and life of the fastener.

In FIGS. 7 to 12 there is illustrated a modification of the fastening device which is similar to that illustrated in FIGS. 1 to 6, and wherein the corresponding parts are identified by similar reference numerals. In this form, the fastening device, designated generally at 52, is particularly useful in mounting or securing an object, such as a molding, trim strip, knob, handle or the like (not shown), to the forward side of a lower supporting wall or panel P′ (FIGS. 11 and 12) which is not conveniently or readily accessible at a rearward side to complete the installation. In this form, however, the blank is provided so as to define a base 54 which is bent downwardly and outwardly at the opposite ends, as at 56 and 58, to provide a pair of wings 60 and 62. The wings 60 and 62 project outwardly and angularly upwardly (FIG. 9) relative to the general plane of the base 54 so as to provide a resilient gripping action with the confronting forward side of another part, such as the upper panel P″. The wings 60 and 62 are also bowed or curved concavely, in elevation (FIG. 8), so as to provide a smooth camming engagement with the aforementioned confronting forward side of the upper panel P″ during installation of the fastener. It can further be seen from FIG. 1 that the wings 60 and 62 extend normal or at right angles to the aforementioned type of resilient fingers 24 and 26 which coact with a threaded member S′ in the manner, as aforesaid.

In this form, the material of the base 54 is preferably struck out, as at 64 and 66, to provide a pair of polygonal corner portions 68 and 70 disposed on opposite sides of the finger 26. The corner portions 68 and 70 extend in the same general direction as the wings 60 and 62, but are generally foreshortened so as to be approximately coextensive in length with the base portion 54. The corner portions 68 and 70 are disposed substantially in the general plane of the base 54 and are adapted for coacting engagement with confronting interior marginal edge portions of the opening 72 in the upper panel P″ for preventing width-wise or transverse shifting movement of the fastener when in the installed position with the panel. Thus, it will be noted that the width of the base 54 is of approximately the same dimension as the shorter dimension of the generally rectangular opening 72 provided in the upper panel P″, and the overall length of the fastener, including the dimension of the projecting wings 60 and 62, is substantially greater than the longer dimension of the panel opening. Thus, the base 54 of the fastener, including the corner portions 68 and 70, is adapted to be registered within the panel opening 72 so that the wings 60 and 62 are disposed in underlying relation against the confronting forward side of the upper panel P″, while the resilient fingers 24 and 26 are disposed in overlying relationship with respect to the confronting rearward side of the upper panel P″ adjacent the panel opening 72 (FIG. 11).

Figure 9:
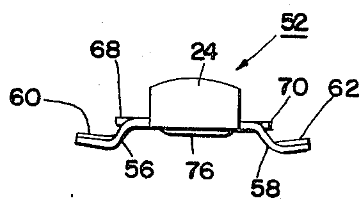
FIG. 9 is a side edge elevational view looking from the right hand side of the fastening device shown in FIG. 7.
Figure 10:
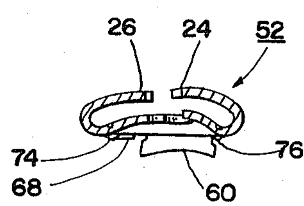
FIG. 10 is a longitudinal cross-sectional view taken along the plane indicated by the line 10—10 of FIG. 7.

To further retain the fastener in registration within the panel opening 72, the base 54 is preferably struck down to provide on its underside a pair of oppositely disposed, parallel ribs 74 and 76 (FIGS. 9 and 10). The ribs 74 and 76 extend in the same general direction as the wings 60 and 62 and are spaced apart a sufficient distance so as to project down into the panel opening 72 and in coacting engagement against other confronting interior marginal edge portions of the opening. By such arrangement, there is further prevented any width-wise or transverse shifting movement of the fastener when in the installed position with the panel.

The fastening device, thus provided, is readily adapted for use as a blind fastener which is applied as shown in FIGS. 11 and 12 from the forward side of the lower supporting panel P. To this end, the fastener may be assembled in the manner aforementioned in the rectangular openings 72 provided in the upper panel P''. The upper panel P'' may be secured to the lower support panel P', as at 78, such as by welding or the like. Thus assembled, a screw S' may then be inserted through an opening 80 provided in the lower support panel P' and moved upwardly into threaded engagement with the fastener mounted in the opening 72 in the upper panel P'', in the manner as aforementioned, for mounting an object such as a molding, trim strip, and so forth to the forward side of the lower support panel P'. In some instances, as an alternative, the upper panel P'' may be pre-assembled with the lower support panel P' to provide a composite or unitary structure to which the fastener may thereafter be applied to achieve the blind installation in accordance with the present invention.

In this embodiment, though the assembly or panel opening 72 in the upper panel P'' is shown provided in a generally rectangular configuration, it is to be understood that such opening may be formed in a circular or other selected configuration with the fastening device constructed for securement in any such opening in accordance with the present invention.

While the invention has been described in detail with specific examples, such examples are intended as illustrations only in as much as the invention fully contemplates various modifications which may be provided without departing from the spirit and scope of the invention.

I claim:

1. A sheet metal fastening device for securement with a threaded member, such as a screw, bolt or the like, said device comprising, a generally flat base having an aperture therein, thread engaging means defined by marginal portions of said aperture which extend outwardly from said base for engagement with the lower surface of a thread of said threaded member when initially inserted through said aperture, a pair of resilient finger portions made integral with an extending upwardly and angularly inwardly from a said base on opposite sides of the aperture therein, the free ends of said finger portions being axially off-set relative to one another and extending generally radially inward toward one another in overhanging relationship relative to said thread engaging means, said thread engaging means including an upwardly projecting generally frusto-conical projection defining upper and lower generally helical edges separated by a slot portion formed radially relative to the aperture in the said base portion, the maximum transverse distance between said edges being substantially greater than the maximum transverse dimension between the free ends of said finger portions, the minimum transverse dimension between said edges being substantially greater than the root diameter of said threaded member adapted to be inserted through the aperture in the said base, and the maximum transverse distance between the free ends of said finger portions being substantially less than the root diameter of said threaded member for engagement with the upper surface of a thread of the threaded member when initially inserted through said aperture, whereby upon turning of said threaded member through said aperture a force is imparted by said threaded member to initially draw said edges downwardly and axially into engagement with said lower thread surface, and substantially simultaneously therewith to pivot said finger portions through a generally vertical plane and radially inwardly into engagement with said upper thread surface, so that a counter-force is imparted by said threaded member to pivot said finger portions in generally opposite directions to draw said edges downwardly and axially inwardly, thereby to urge said edges and said finger portions into tight gripping engagement with the root portions of said threaded member so that in the final installed position, the axial distance between the corresponding axially aligned points on said edges and the free ends of said finger portions is substantially greater than in the said initially installed position thereof.

2. A fastening device in accordance with claim 1, wherein the base has a resilient arm bent downwardly therefrom and extending angularly upwardly in the general direction of the base and coacts with the base to provide a clip for attachment of the fastener to a support panel or the like.

3. A fastening device in accordance with claim 2, wherein said arm includes a slot opening onto its free end thereof and disposed below the aperture in said base for receiving said member therethrough, the material of said arm adjacent said slot being deformed to provide a warped edge for engagement with marginal portions of an aperture provided in said panel.

4. A fastening device in accordance with claim 1, wherein said base is of a generally flat configuration and is adapted to be disposed within a polygonal shaped opening in a supporting panel, and has a pair of accurate, downwardly bowed wings projecting outwardly from opposite sides thereof and disposed below and generally normal to said fingers and adapted for engagement with a panel to which the fastener is applied.

5. A fastening device in accordance with claim 4, wherein said base is cut out adjacent the juncture with each of said wings to provide a pair of turned up corner portions extending from the general plane of the base and on one side of said aperture for engagement with interior marginal edge portions of said panel, opening to prevent lateral shifting movement of said fastener when in assembled position with said panel.

References Cited by the Examiner

UNITED STATES PATENTS

| | | | |
|---|---|---|---|
| 2,239,797 | 4/1941 | Tinnerman | 85—36 |
| 2,400,545 | 5/1946 | Kost | 85—36 |
| 2,434,844 | 1/1948 | Flora. | |
| 2,494,882 | 1/1950 | Kost. | |
| 2,745,458 | 5/1956 | Bedford | 151—41.75 |
| 2,758,627 | 8/1956 | Randall. | |
| 2,771,113 | 11/1956 | Flora | 151—41.75 |
| 2,893,458 | 7/1959 | Flora | 151—41.75 |

FOREIGN PATENTS

| | | |
|---|---|---|
| 651,270 | 3/1951 | Great Britain. |
| 761,771 | 11/1956 | Great Britain. |

CARL W. TOMLIN, *Primary Examiner.*

MARION PARSONS, Jr., *Examiner.*